US011153781B2

(12) United States Patent
Zhang et al.

(10) Patent No.: US 11,153,781 B2
(45) Date of Patent: Oct. 19, 2021

(54) VARIABLE CYCLIC PREFIX (CP) WITHIN A TRANSMISSION SLOT IN MILLIMETER WAVE BAND

(71) Applicant: QUALCOMM INCORPORATED, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 16/513,166

(22) Filed: Jul. 16, 2019

(65) Prior Publication Data
US 2020/0068435 A1 Feb. 27, 2020

Related U.S. Application Data

(60) Provisional application No. 62/722,534, filed on Aug. 24, 2018.

(51) Int. Cl.
| | |
|---|---|
| *H04W 28/06* | (2009.01) |
| *H04L 27/26* | (2006.01) |
| *H04W 72/08* | (2009.01) |

(52) U.S. Cl.
CPC .......... *H04W 28/06* (2013.01); *H04L 27/2605* (2013.01); *H04W 72/082* (2013.01)

(58) Field of Classification Search
CPC ............. H04L 27/2605; H04L 27/2607; H04L 27/2608; H04W 28/06; H04W 72/082; H04W 72/1263; H04W 72/1278; H04W 72/042
See application file for complete search history.

(56) References Cited

U.S. PATENT DOCUMENTS

| | | | | |
|---|---|---|---|---|
| 9,763,211 | B2* | 9/2017 | Li ........................ | H04W 72/042 |
| 10,237,103 | B2* | 3/2019 | Manolakos ........... | H04L 5/0048 |
| 2009/0296645 | A1* | 12/2009 | Bui ..................... | H04L 27/2627 370/329 |
| 2010/0085955 | A1* | 4/2010 | Luo ..................... | H04L 27/2607 370/344 |
| 2013/0258935 | A1* | 10/2013 | Zhang .................. | H04L 12/189 370/312 |

(Continued)

OTHER PUBLICATIONS

International Search Report and Written Opinion—PCT/US2019/042192—ISA/EPO—dated Oct. 14, 2019.

*Primary Examiner* — Kent Krueger

(57) ABSTRACT

Wireless communications systems and methods related to applying variable cyclic prefix (CP) lengths to symbols within a transmission period in a wireless network are provided. A first wireless communication device identifies a first cyclic prefix (CP) configuration for a transmission period. The first wireless communication device communicates, with a second wireless communication device during the transmission period, a first communication signal including a first plurality of symbols, wherein each of the first plurality of symbols include an individually configurable CP length configured based on the first CP configuration. A first symbol of the first plurality of symbols includes a first CP length. A second symbol of the first plurality of symbols includes a second CP length that is longer than the first CP length.

24 Claims, 8 Drawing Sheets

(56) References Cited

U.S. PATENT DOCUMENTS

| | | | |
|---|---|---|---|
| 2013/0315321 A1* | 11/2013 | Rajagopal | H04L 27/261 375/260 |
| 2015/0295743 A1* | 10/2015 | Hwang | H04W 48/12 370/280 |
| 2017/0033887 A1* | 2/2017 | Lei | H04L 1/0002 |
| 2017/0244586 A1 | 8/2017 | Yoo et al. | |
| 2017/0331658 A1 | 11/2017 | Chen et al. | |
| 2018/0083817 A1* | 3/2018 | Salem | H04L 27/2607 |

* cited by examiner

| | 310 | 320 | 330 | 340 | 350 | 360 | 370 |
|---|---|---|---|---|---|---|---|
| | FFT size | SCS (MHz) | NR notation (kHz) | # of RBs (93% of 2.16GHz) | Symbol length (ns) | NCP (ns) | ECP (ns) |
| 302— | 4096 | 0.96 | 15 x 2⁶ | 174 RBs | 1042 | 74.4 | N/A |
| 304— | 2048 | 1.92 | 15 x 2⁷ | 87 RBs | 521 | 37.2 | N/A |
| 306— | 1024 | 3.84 | 15 x 2⁸ | 43 RBs | 260.5 | 18.6 | 65 |
| 308— | 512 | 7.68 | 15 x 2⁹ | 21 RBs | 130 | 9.3 | 32.5 |

VARIABLE CYCLIC PREFIX (CP) WITHIN A TRANSMISSION SLOT IN MILLIMETER WAVE BAND

CROSS REFERENCE TO RELATED APPLICATIONS

The present application claims priority to and the benefit of U.S. Provisional Patent Application No. 62/722,534, filed Aug. 24, 2018, which is hereby incorporated by reference in its entirety as if fully set forth below and for all applicable purposes.

TECHNICAL FIELD

This application relates to wireless communication systems, and more particularly to improving performance and resource utilization efficiency in wireless networks operating at high millimeter wave (mmWave) bands by applying variable cyclic prefix (CP) lengths to symbols within a transmission period.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands.

In wireless communication systems, when a data signal is transmitted over a wireless channel, the signal can be distorted due to a multipath effect. Multipath effect refers to the scenario where a transmitted signal travels along multiple paths to reach a receiver. The multiple paths may include line-of-sight (LOS) paths and/or non-line-of-sight (NLOS) paths. As such, the distances of the multiple paths may be different. Thus, the same signal traveled over the multiple paths may reach a receiver at different times. In other words, the receiver may receive multiple signals of the same transmitted signal at different times. The delay between the arrival times of the multiple signals can introduce inter-symbol interference (ISI) at the receiver. The delay may be referred to as a channel delay spread.

In orthogonal frequency division multiplexing (OFDM)-based transmissions, data are formatted into frames including a plurality of symbols. To mitigate ISI, each symbol is appended with a CP, which is a copy of the data at the end of the symbol. In order to be effective in eliminating ISI, the CP length is required to be greater than the channel delay spread. While CPs can be used to eliminate ISI, the CP addition results in a loss of spectral efficiency or bandwidth efficiency since CPs do not convey information. Thus, there is a tradeoff between performance and spectral efficiency. The tradeoff may be important at the high mmWave bands when a large subcarrier spacing (SCS) is used with a wide bandwidth.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including identifying, by a first wireless communication device, a first cyclic prefix (CP) configuration for a transmission period; and communicating, by the first wireless communication device with a second wireless communication device during the transmission period, a first communication signal including a first plurality of symbols, wherein each of the first plurality of symbols include an individually configurable CP length configured based on the first CP configuration.

In an additional aspect of the disclosure, an apparatus including a processor configured to identify a first cyclic prefix (CP) configuration for a transmission period; and a transceiver configured to communicate, with a first wireless communication device during the transmission period, a first communication signal including a first plurality of symbols, wherein each of the first plurality of symbols include an individually configurable cyclic prefix (CP) length configured based on the first CP configuration.

In an additional aspect of the disclosure, a computer-readable medium having program code recorded thereon, the program code including code for causing a first wireless communication device to identify a first cyclic prefix (CP) configuration for a transmission period; and code for causing the first wireless communication device to communicate, with a second wireless communication device during the transmission period, a first communication signal including a first plurality of symbols, wherein each of the first plurality of symbols include an individually configurable cyclic prefix (CP) length configured based on the first CP configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
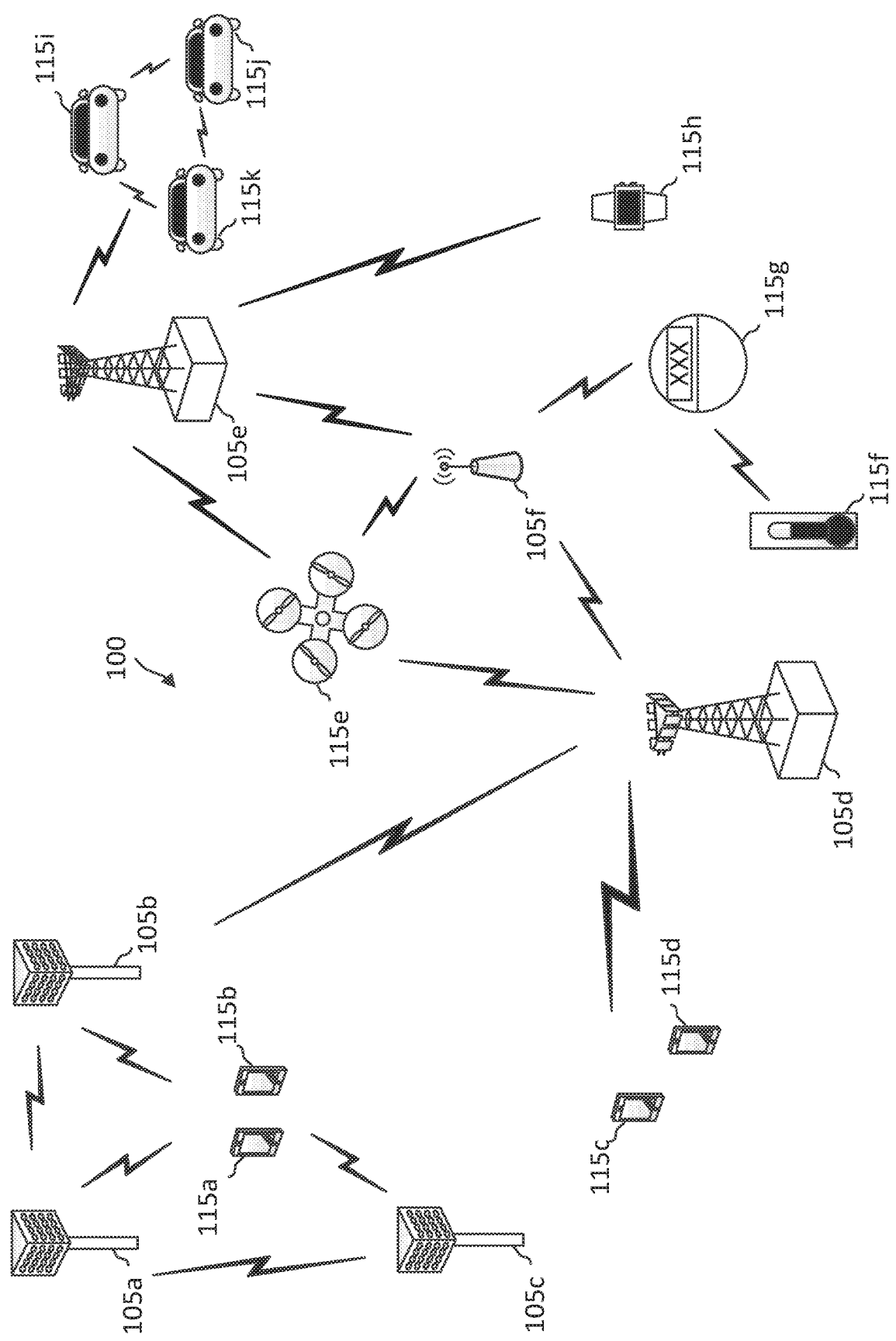
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a wireless communication device, which may be a BS or a UE, receives data in the form of a transport block (TB) from a higher network layer. The wireless communication device generates a communication signal by encoding the data and organizing the encoded data into symbols for transmission during a transmission period. In addition, the wireless communication device may include reference signal symbols in the transmission to facilitate channel estimation and demodulation at a receiver.

The present application describes mechanisms for improving system performance and resource utilization in a wireless network operating in high mmWave bands (e.g., at about 50 GHz, about 60 GHz, or higher than 60 GHz) by varying CP lengths of symbols within a transmission period. The present disclosure allows each symbol within a transmission period to include an individually configurable CP. For example, a BS or a network may configure a set of symbols in the transmission period to include a first CP length or duration and another set of symbols in the transmission period to include a second CP length or duration longer than the first CP length or duration.

In an embodiment, the BS or the network may configure a CP length for each symbol within a transmission period or for each set of symbols within a transmission period based on a channel condition, a target operating signal-to-noise ratio (SNR), a modulation coding scheme (MCS) used for the transmission, a number of symbols in the transmission period with the longer CP, and/or whether a symbol is used for carrying data or a reference signal. The CP lengths may be configured such that there are an integer number of symbols within the transmission period. In some embodiments, a reference signal can be carried by a symbol with a longer CP to ensure a good channel estimation performance at the receiver.

In an embodiment, a BS may communicate with a UE using multiple CP configurations with different CP patterns (e.g., with different long CP symbol locations and/or different CP lengths). For example, the BS may broadcast network information using a predetermined CP configuration to enable the UE to perform an initial network access. Subsequently, the BS may communicate with the UE using a different CP configuration.

In an embodiment, multiple CP configurations or patterns may be configured as a function of subcarrier spacing (SCS). Thus, a BS and a UE may communicate with each other based on a CP configuration corresponding to an SCS used for the communication.

Aspects of the present disclosure can provide several benefits. For example, the individually configurable CP lengths within a transmission period allow a network to use a longer CP length for certain symbols (e.g., reference signal symbols) in a transmission period, but not all symbols within the transmission period. In addition, CP lengths within a transmission period can be configured based on channel conditions, performance requirements, and/or scheduling requirements. Thus, the disclosed embodiments can improve system performance without increasing the CP overhead for all symbols within a transmission period, which can be inefficient. The disclosed embodiments may be applied to communications in a licensed spectrum, a shared spectrum, and/or an unlicensed spectrum.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel during the TXOP. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected from the channel.

In an embodiment, the network 100 may operate in a high mmWave band (e.g., (e.g., at about 50 GHz, about 60 GHz, or higher than 60 GHz), which may include a licensed band, an unlicensed band, and/or a shared frequency band, with a wide channel bandwidth (e.g., up to about 2.16 GHz) as described in greater detail herein.

Figures 2, 3:
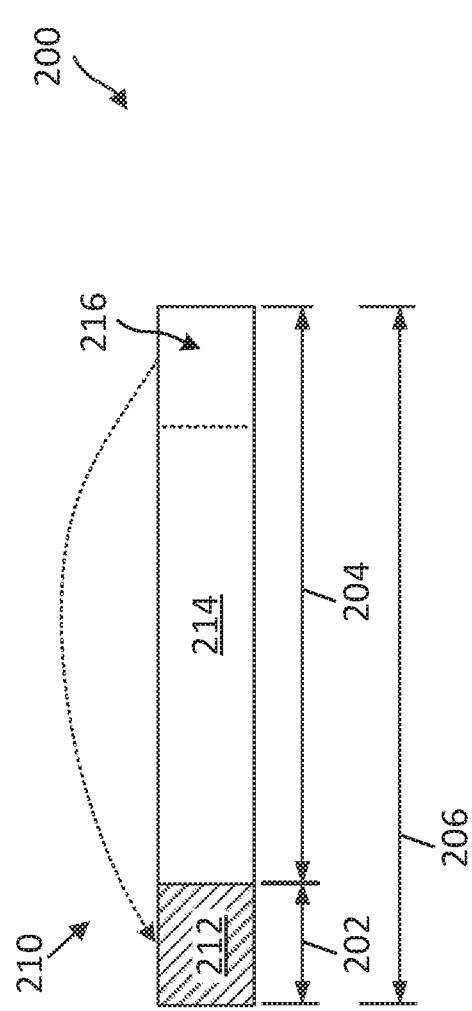
FIG. 2 illustrates a symbol configuration according to embodiments of the present disclosure.
FIG. 3 is a table illustrating example numerologies for various subcarrier spacing (SCS) according to embodiments of the present disclosure.

FIG. 2 illustrates a symbol configuration 200 according to embodiments of the present disclosure. The configuration 200 may be employed by BSs such as the BSs 105 and UEs such as the UEs 115 in a network such as the network 100 for formatting data for transmissions. The configuration 200 includes a symbol 210 (e.g., an OFDM symbol). The symbol 210 includes a CP 212 and a useful portion 214. The useful portion 214 may carry data or reference signal information. The CP 212 is a copy of the last portion 216 of the useful portion 214. Fast Fourier transform (FFT) and/or inverse Fast Fourier transform (IFFT) operations are applied to the useful portion 214. The symbol 210 has a duration 206. The CP 212 has a duration 202. The useful portion 214 has a duration 204. The duration 204 may include $N_{FFT}$ samples and the CP duration 202 may include $N_{CP}$ samples corresponding to the last $N_{CP}$ samples of the useful portion 214.

As an example, at a transmitter, information data bits may be encoded and modulated based on a modulation coding scheme (MCS) to form modulation symbols. The modulation symbols are mapped to frequency subcarriers to form a frequency domain signal. An IFFT (e.g., of size $N_{FFT}$) is applied to the frequency domain signal to form a time domain signal corresponding to the useful portion 214. The last portion 216 of the useful portion 214 is copied to the beginning of the useful portion 214 forming the symbol 210. A receiver may receive the symbol 210. At the receiver, the CP 212 of the received symbol 210 is discarded and an FFT (e.g., of size $N_{FFT}$) is applied to the useful portion 214 of the received symbol 210. Subsequently, subcarrier de-mapping, demodulation, and decoding may be performed to recover the original information data bits transmitted by the transmitter.

The CP 212 serves to mitigate ISI caused by multipath effects in the transmission. The length or the duration 202 of the CP 212 can determine the effectiveness of the ISI cancellation. For example, the duration 202 is required to be greater than the channel delay spread in order to eliminate ISI. However, as the CP duration 202 increases, the CP overhead increases causing a reduction in spectral utilization efficiency.

FIG. 3 is a table 300 illustrating example numerologies 302, 304, 306, and 308 for a mmWave band, for example, for a 60 GHz band with a channel bandwidth of about 2.16 GHz, according to embodiments of the present disclosure. The numerologies 302, 304, 306, and 308 may be employed by BSs such as the BSs 105 and UEs such as the UEs 115 in a network such as the network 100. The numerologies 302, 304, 306, and 308 may be applied to a symbol such as the symbol 210.

Numerologies may include SCS, FFT size, symbol length or duration (e.g., the duration 206), and/or CP length or duration (e.g., the duration 202). As described above, high mmWave bands typically includes much wider channel bandwidths (e.g., between about 1-2 GHz, 2-3 GHz, or greater than 3 GHz) than lower frequency bands. As the FFT size required for operating on a useful symbol portion (e.g., the useful portion 214) is dependent on the channel bandwidth and the SCS, the SCS needs to be sufficiently large when the channel bandwidth is wide in order to maintain an FFT size that is practical for implementation. The larger SCS results in a shorter symbol duration. Thus, for a given CP overhead, the CP duration reduces as the SCS increases. On the other hand, for a given CP duration, the CP overhead increases as the SCS increases.

In the table 300, the column 310 shows FFT sizes (e.g., $N_{FFT}$). The column 320 shows SCS in units of MHz. The column 330 shows NR notations in units of kHz. The NR notation refers to the use of scaled numerologies in the high mmWave band based on NR numerologies. For example, NR supports numerologies including SCSs of 15 kHz, 30 kHz, 60 kHz, 120 kHz, and 240 kHz, which are in the family of 15 kHz×$2^n$. When high mmW band uses a larger SCS, it is also consistent with the NR notation so the SCS is also in the family of 15 kHz×$2^n$. In addition, in NR, the CP duration of 30 kHz numerology is half of the CP duration of 15 kHz. Or more generally, the CP duration is reduced by a factor of $2^n$ when the SCS is increased by a factor of $2^n$. When the high mmW band uses an SCS of 15 kHz×$2^n$, the CP duration scales down by a factor of $2^n$ accordingly. The column 340 shows the number of RBs based on a utilization of about 93 percent (%) of the 2.16 GHz bandwidth. The column 350 shows symbol lengths (e.g., the symbol duration 206 without the CP portion) in units of nanoseconds (ns). The column 360 shows CP durations (e.g., the CP duration 202) for normal CPs (NCPs) in units of ns. The column 370 shows CP durations for enhanced CP (ECPs) in units of ns.

It should be noted that the table 300 illustrates specific example numerologies 302, 304 306, and 308 for illustration purpose. In general, any suitable combination of FFT size and SCS can be used for a given channel bandwidth. FFT sizes are typically chosen to be between about 512 to about 4096 to maintain a sufficiently low complexity suitable for implementation. However, the FFT size can be less than 512 or greater than 4096. The SCS may vary based on the FFT size and the channel bandwidth. The symbol length or duration may vary based on the FFT size and the SCS. The number of usable RBs may be based on any desired frequency utilization rate. The NCP durations shown in the column 360 are scaled in proportion to the SCSs based on a fixed NCP overhead similar to the NCP overhead in NR. Similarly, the ECP durations shown in the column 370 are scaled in proportion to the SCSs based on a fixed ECP overhead similar to the ECP overhead in NR As described above, CPs can be used to mitigate ISI caused by a channel delay spread. For a short distance mmWave link with beamforming, the channel delay spread may be small. For example, the channel delay spread may be up to about 10 ns for a line-of-sight (LOS) channel and may be up to about 100 ns for a non-line-of-sight (NLOS) channel. In some instances, the delay spread can reduce with post beamforming. As can be seen in the table 300, the NCP durations for the 3.84 MHz SCS (e.g., in the numerology 306) and the 7.68 MHz SCS (e.g., in the numerology 308) are about 18.6 ns and 9.3 ns, respectively, which may not be sufficient to combat the delay spread of up to about 100 ns. Thus, ECPs (e.g., with a 20% CP overhead as in NR) may be required for the larger SCSs of 3.84 MHz and 7.68 MHz as shown in the column 360.

When a CP is not long enough to cover or overcome a delay spread, system performance can be impacted. The lack of CP may have different impacts to symbols carrying data and symbols carrying reference signals (e.g., demodulation reference signals (DMRSs)). For example, for frequency domain equalization, which may be applied to data symbols, the lack of CP can lead to ISI at the modulation symbols located at the beginning of a symbol (e.g., the symbol 210). This may create an SNR cap, which may be quite high. On the other hand, for channel estimation, which may be determined from DMRS symbols, the lack of CP can be more problematic. Non-ideal channel estimation can lead to a sub-optimal equalizer, creating an SNR cap at a lower SNR than the SNR cap resulted from the lack of CP in frequency domain equalization. In general, the lack of CP in DMRS symbols can cause a greater degradation in system performance than the lack of CP in data symbols.

Current wireless communication protocols (e.g., 4G, 5G or NR) support two CP modes, an NCP mode and an ECP mode. The ECP mode includes a longer CP than the NCP mode. In a transmission period or a transmission slot, all symbols may include a fixed CP length, which may be an NCP or an ECP. In some instances, for the NCP mode, the first symbol or a beginning symbol of a transmission period may have a longer CP to allow an integer number of symbols to fit in a transmission period. In any case, only the NCP or the ECP can be used and the CP of each symbol within a transmission period is fixed. In NR, ECPs have a fixed CP overhead of about 20%. As described above, ECPs may be required in high mmWave bands due to the larger SCS and shorter symbol duration. In other words, when applying the NR configuration, ECPs are likely to be required at the high mmWave bands, especially when the numerologies with a larger SCS and a smaller FFT size are considered.

However, due to the higher phase noise and RF noise at the high mmWave bands, high operating SNRs may not be achievable. Thus, it may not be necessary to always use ECPs with the 20% CP overhead. Accordingly, the present disclosure provides techniques to vary the CP lengths or duration for symbols within a transmission period based on a target operating SNR, an MCS, and/or whether the symbol is for carrying data or a DMRS.

Figure 4:
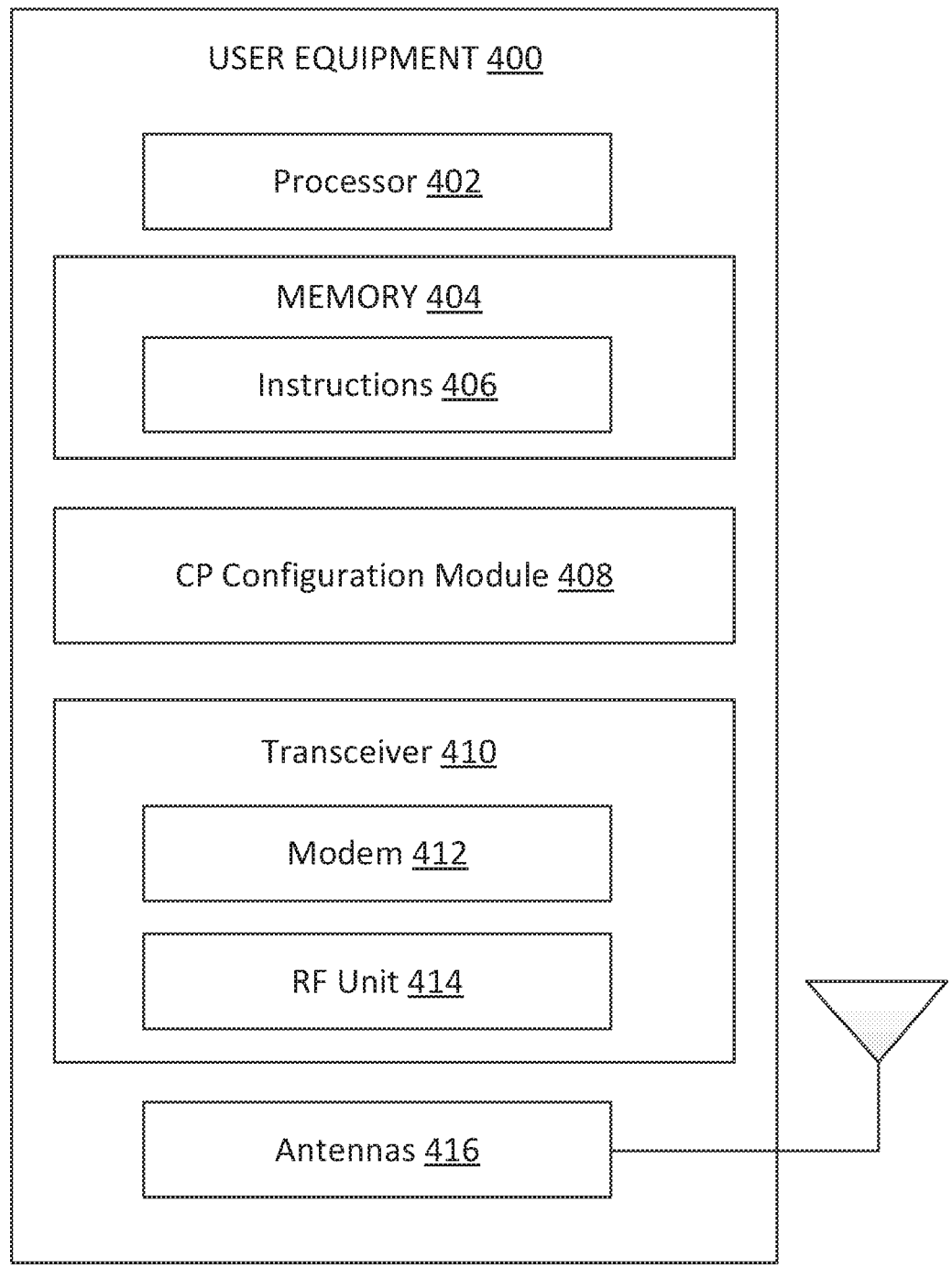
FIG. 4 is a block diagram of a user equipment (UE) according to embodiments of the present disclosure.

FIG. 4 is a block diagram of an exemplary UE 400 according to embodiments of the present disclosure. The UE 400 may be a UE 115 as discussed above in FIG. 1. As shown, the UE 400 may include a processor 402, a memory 404, a CP configuration module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-9. Instructions 406 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The CP configuration module 408 may be implemented via hardware, software, or combinations thereof. For example, the CP configuration module 408 may be implemented as a processor, circuit, and/or instructions 406 stored in the memory 404 and executed by the processor 402. The CP configuration module 408 may be used for various aspects of the present disclosure, for example, aspects of FIGS. 6-9. For example, the CP configuration module 408 is configured to receive CP configurations from a BS (e.g., the BSs 105) and/or configure CPs for transmit and/or receive processing based on a corresponding predetermined CP configuration and/or the received CP configurations, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the CP configuration module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
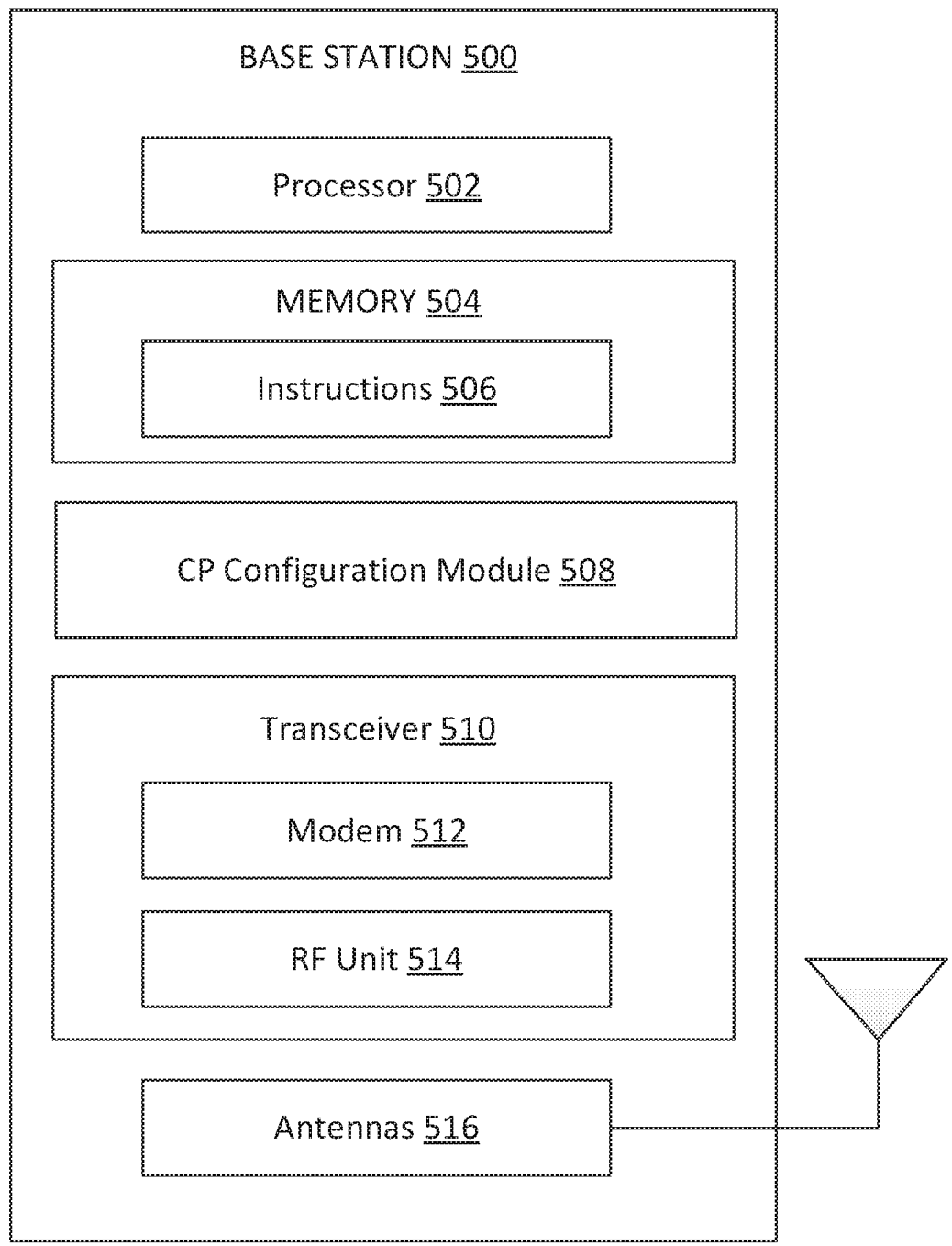
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above in FIG. 1. A shown, the BS 500 may include a processor 502, a memory 504, a CP configuration module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The CP configuration module 508 may be implemented via hardware, software, or combinations thereof. For example, the CP configuration module 508 may be implemented as a processor, circuit, and/or instructions 506 stored in the memory 504 and executed by the processor 502. The CP configuration module 508 may be used for various aspects of the present disclosure, for example, aspects of FIGS. 6-9. For example, the CP configuration module 508 is configured to determine CP lengths for symbols in a transmission slot or transmission period based on scheduling decisions (e.g., a target operating SNR, an MCS, and/or whether a symbol is used for carrying data or a reference signal), transmit the determined CP configurations to UEs (e.g., the UEs 115) indicating the CP lengths for a transmission slot or transmission period, communicate with the UEs based on the CP configurations.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
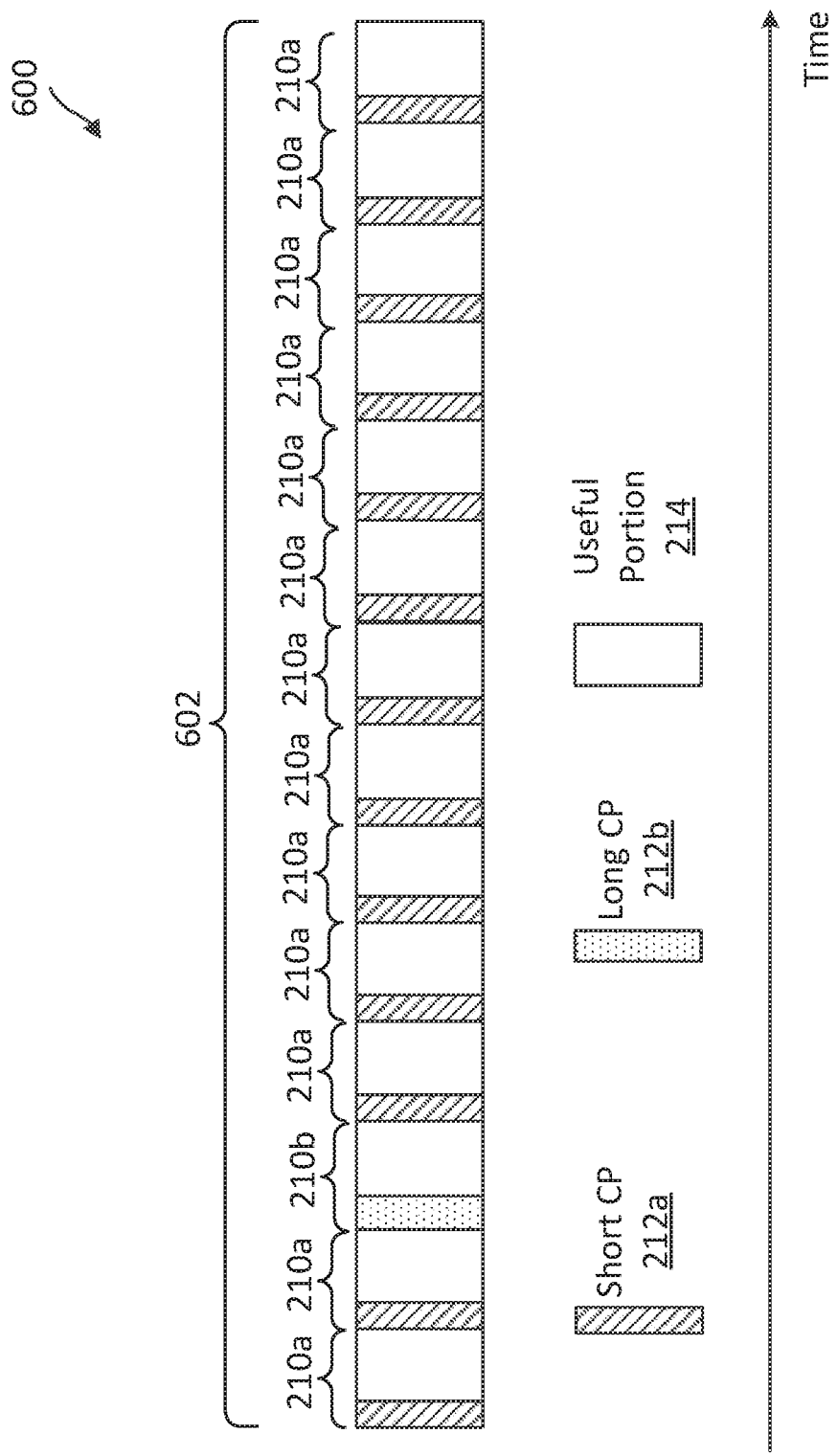
FIG. 6 illustrates a variable cyclic prefix (CP) configuration scheme according to some embodiments of the present disclosure.

FIG. 6 illustrates a variable CP configuration scheme 600 according to some embodiments of the present disclosure. The scheme 600 may be employed by BSs such as the BSs 105 and 500 and UEs such as the UEs 115 and 400 in a network such as the network 100. The scheme 600 is described using the symbol structure shown in FIG. 2, and may use the same reference numerals as in FIG. 2 for simplicity sake. The scheme 600 includes a transmission period 602. In some instances, the transmission period 602 may be referred to as a transmission slot or a transmission time interval (TTI). Each transmission period 602 may be used to transmit a transport block (TB) over a radio link. A TB refers to a physical layer transmission frame carrying encapsulated higher network layer data. In some instances, multiple TB s may be transmitted in a TTI when multiple spatial layers are used for the transmissions.

The transmission period 602 may include an integer number of symbols 210. The number of symbols 210 in the transmission period 602 may vary depending on the embodiments. For example, the transmission period 602 may include between about 2 symbols 210 to about 15 symbols 210. In some embodiments, the transmission period 602 may include about 12 symbols 210 or about 14 symbols 210. In such embodiments, when the symbols 210 include a numerology similar to the numerology 308 (e.g., an SCS of about 7.68 MHz, an FFT size of about 512), the transmission period 602 may span about 2 microseconds (μs).

In the scheme 600, the length or duration (e.g., the duration 202) of the CP 212 for each symbol 210 in a transmission period 602 may be individually configurable. For example, some symbols 210 may include a longer CP 212 than some other symbols 210 in the transmission period 602. As shown, the symbols 210a include a short CP 212a and the symbol 210b includes a long CP 212b. The short CP 212a and the long CP 212b may have any suitable duration. For example, the long CP 212b may be about 2 to 4 times (or some other value depending on the target use case and requirement) longer than the short CP 212a. While the transmission period 602 is illustrated with a single long CP symbol 210b, a transmission period 602 can include any suitable number of long CP symbols 210b. In general, the number of symbols 210a with the short CPs 212a, the number of symbols 210b with the long CPs 212b, the length of the short CP 212a, and/or the length of the long CP 212b may vary depending on scheduling decisions at the BS, for example, based on target operating SNRs, MCSs, and/or whether a symbol 210 is a data symbol or a DMRS symbol, as described in greater detail herein.

An NR mmWave system may configure slots (e.g., the transmission period 602) with about 14 symbols when operating in an NCP mode and may configure slots with about 12 symbols when operating in an ECP mode. In addition, NR allows a flexible number of DMRS symbols and flexible DMRS symbol locations within a slot.

The scheme 600 may maintain a substantially similar slot or transmission period configurations as NR, but may vary the length or duration of the CP 212 in a transmission period 602 to tradeoff system performances and CP overheads. In order to maintain the same number of symbols 210 (for example, about 14 symbols per slot) and a fixed slot duration for a given SCS (e.g., a 3.91 μs slot duration with a 3.84 MHz SCS) across transmission periods 602, the scheme 600 may vary the lengths or durations of the short CP 212a and/or the long CP 212b depending on the number of symbols 210 in a transmission period 602 are configured as long CP symbol 210b.

As described above, a lack of CP in a symbol carrying a reference signal (e.g., a DMRS) can cause a greater performance degradation than a lack of CP in a symbol carrying data. Thus, in some embodiment, the scheme 600 may transmit a reference signal or a DMRS on a symbol 210b with a long CP 212b to ensure a good channel estimation performance at the receiver. In other words, when a high target operating SNR is desired, a DMRS may be transmitted in a long CP symbol 210b. In addition, a long CP symbol 210b for DMRS transmission when the transmission uses a high-order MCS. Conversely, it may not be necessary to use a long CP symbol 210b for DMRS transmission when a transmission uses a low MCS or when the target operating SNR is low. Accordingly, a BS may determine a CP 212 length for each symbol 210 in a transmission period 602 based on scheduling needs (e.g., MCSs, target operating SNRs, and/or number of DMRSs in a transmission period 602).

The use of a variable CP length individually configurable for each symbol in a transmission period instead of selecting between an NCP or an ECP for all symbols 210 within a transmission period can thus improve system performance without significantly increasing the CP overhead.

Figure 7:
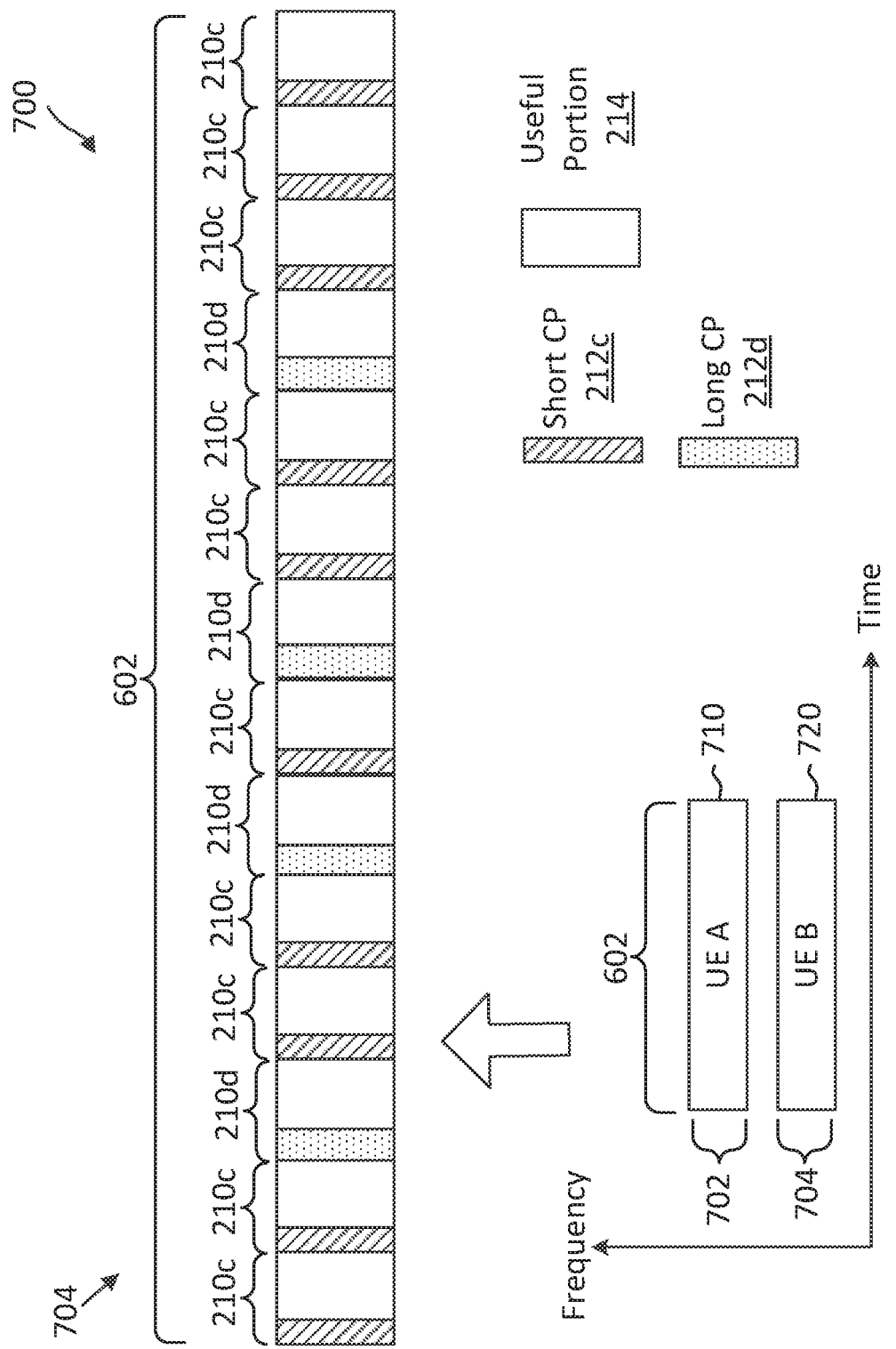
FIG. 7 illustrates a variable CP configuration scheme according to some embodiments of the present disclosure.

FIG. 7 illustrates a variable CP configuration scheme 700 according to some embodiments of the present disclosure. The scheme 700 may be employed by BSs such as the BSs 105 and 500 and UEs such as the UEs 115 and 400 in a network such as the network 100. The scheme 700 may be substantially similar to the scheme 600, and may use the same reference numerals as in FIGS. 2 and 6 for simplicity sake. However, the scheme 700 may consider multiple UEs when determining a CP configuration. For example, a BS may configure multiples UEs for communications in the same transmission period 602 using FDM. As shown, the BS may configure a UE A for a communication 710 in a frequency band 702 during a transmission period 602 and may configure a UE B for a communication 720 in another frequency band 704 during the same transmission period 602. Since the communications 710 and 720 are scheduled for the same transmission period 602, the CPs 212 and the symbols 210 are required to be aligned across the communications 710 and 720. In the scheme 700, the BS may still have the flexibility to determine a set of symbols 210c with a short CP 212c and a set of symbols 210d with a long CP 212d in the transmission period 602. However, the BS may consider scheduling needs for the communications 710 and 720. For example, the BS may determine a first MCS and/or a first target operating SNR for the communication 710. The BS may determine a second MCS and/or a first target operating SNR for the communication 720. The BS may determine a number of DMRS symbols (e.g., the symbols 210d), a number of data symbols (e.g., the symbols 210c), the location of the symbols 210c and 210d and corresponding CPs 212c and 212d, respectively, that may satisfy or support the first MCS, the second MCS, the first target operating SNR, and the second target operating SNR. Similar to the scheme 600, the scheme 700 may configure the long CP symbols 210d for DMRS transmissions. In general, the BS may determine one or more CP configurations or patterns (e.g., the symbols 210 with the longer CP 212) within a cell and may apply a certain CP configuration for communications at a certain time period.

While the schemes 600 and 700 are described in the context of using two different CP lengths in a transmission period, similar mechanisms may be applied to include more than two different CP lengths (e.g., about 3, 4 or more CP lengths) in a transmission period 602.

Figure 8:
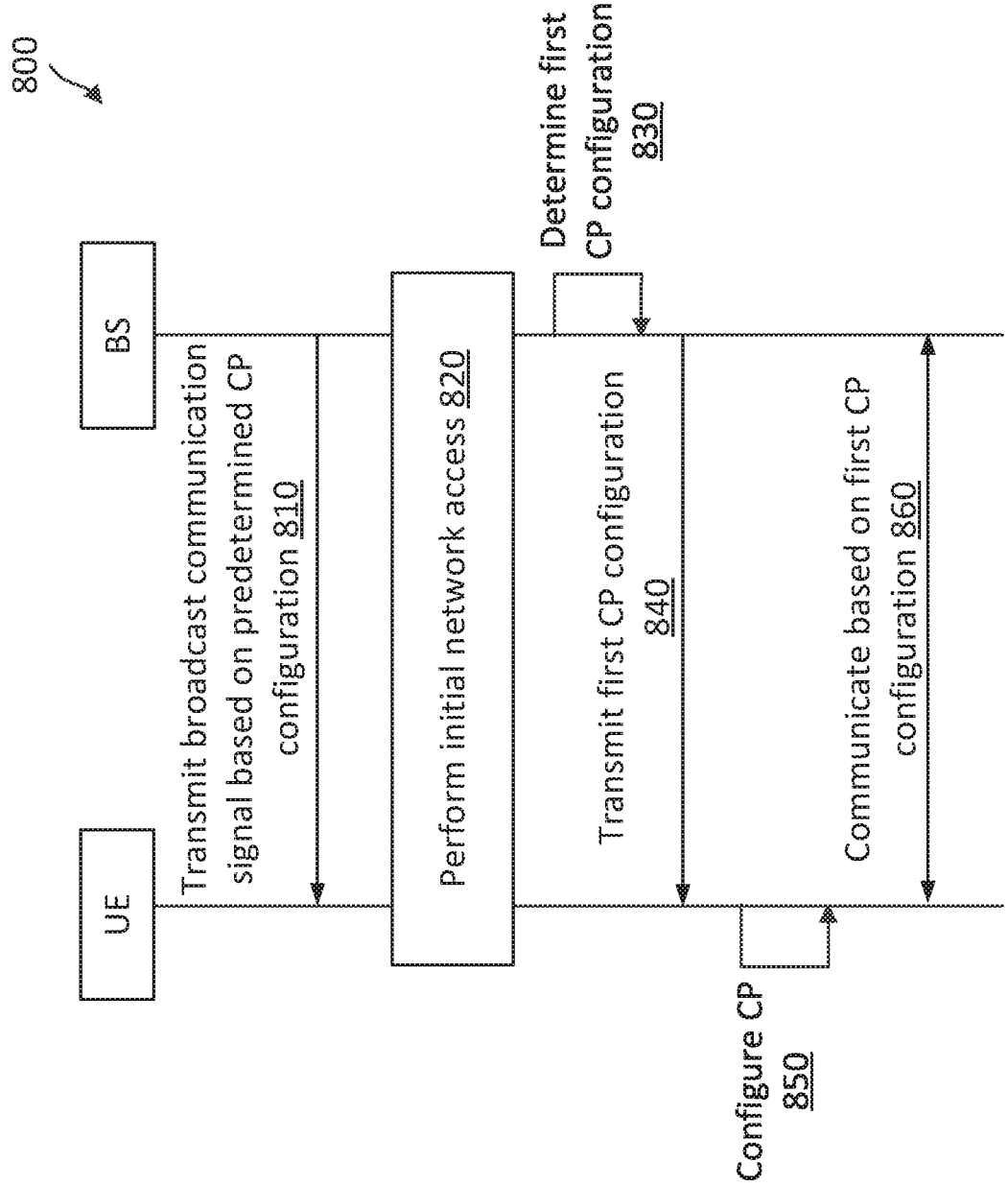
FIG. 8 is a signaling diagram illustrating a communication method using variable CPs according to some embodiments of the present disclosure.

FIG. 8 is a signaling diagram illustrating a communication method 800 using variable CPs according to some embodiments of the present disclosure. The method 800 is implemented by a BS (e.g., the BSs 105 and 500) and a UE (e.g., the UEs 115 and 400). The method 800 may use similar mechanisms as in the schemes 600 and 700 described above with respect to FIGS. 6 and 7, respectively. Steps of the method 800 can be executed by computing devices (e.g., a processor, processing circuit, and/or other suitable component) of the BS and the UE. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the BS transmits a broadcast communication signal based on a predetermine CP configuration. The broadcast communication signal may include SSBs, MIBs, SIBs, and/or RMSI.

At step 820, the UE performs an initial network access procedure with the BS based on the received broadcast information. The UE may monitor for the broadcast information based on the predetermined CP configuration.

At step 830, the BS determines a first CP configuration. The first CP configuration may indicate a CP length (e.g., the CPs 212a, 212b, 212c, and 212d) for each symbol (e.g., the symbols 210) in a transmission period (e.g., the transmission period 602). The CP configuration may indicate a set of symbols with a first CP length and a second set of symbols with a second CP length longer than the first CP length.

At step 840, the BS transmits the first CP configuration.

At step 850, the UE configures the CP for each symbol in a transmission period based on the received first CP configuration.

At step 860, the UE and the BS may communicate with each other based on the first CP configuration. For example, for transmission, the BS or the UE may generate a signal for transmission in a transmission period by appending a CP to each symbol based on the CP configuration. For reception, the BS or the UE may receive a signal in a transmission period and may process the received signal by discarding CPs based on the CP configuration.

In some embodiments, a few CP configurations or patterns may be allowed by a certain wireless communication protocol or standard and a BS may inform UEs which pattern to use with cell-specific signaling.

In some embodiments, a BS may transmit PBCH signals (e.g., SSBs) using a default CP configuration (e.g., with a non-variable CP length within a transmission period or an NCP). The SSBs may indicate a CP configuration for RMSIs and/or OSI. The RMSI may indicate a CP configuration for subsequent communications. In addition, the BS may further indicate variable CP configurations or patterns (e.g., UE-specific CP configurations) to UEs for UE-specific communications.

In some embodiments, a network may define several predetermined CP configurations that are based on SCSs. In such embodiments, a BS or a UE may identify a CP configuration based on a configured SCS.

In some embodiments, a network or a BS may separately configure a CP configuration for UL communications and another CP configuration for DL communications.

Figure 9:
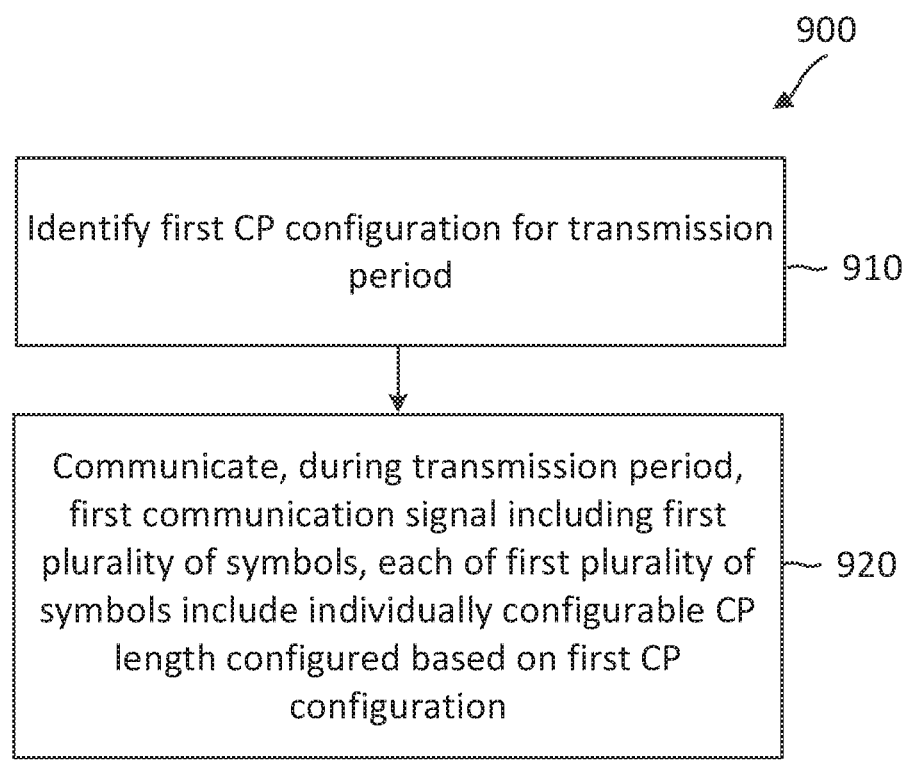
FIG. 9 is a flow diagram of a communication method using variable CPs according to some embodiments of the present disclosure.

FIG. 9 is a flow diagram of a communication method 900 using variable CPs according to some embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the CP configuration module 408, the transceiver 410, and the one or more antennas 416, to execute the steps of method 900. In another example, a wireless communication device, such as the BS 105 or BS 500, may utilize one or more components, such as the processor 502, the memory 504, the CP configuration module 508, the transceiver 510, and the one or more antennas 516, to execute the steps of method 900. The method 900 may employ similar mechanisms as in the schemes 600 and/or 700 described above with respect to FIGS. 6 and/or 7, respectively, and/or the method 800 described above with respect to FIG. 8. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes identifying, by a first wireless communication device, a first CP configuration for a transmission period (e.g., the transmission periods 602).

At step 920, the method 900 includes communicating, by the first wireless communication device with a second wireless communication device during the transmission period, a first communication signal including a first plurality of symbols (e.g., the symbols 210). Each of the first plurality of symbols includes an individually configurable CP length (e.g., the CPs 212a, 212b, 212c, and 212d) configured based on the first CP configuration. The first CP configuration may indicate CP lengths for symbols in the transmission period or locations of symbols including a long CP length. In general, the first CP configuration can include a pattern of CP length pattern in a transmission period.

In an embodiment, a first symbol (e.g., the symbols 210a and 210c) of the first plurality of symbols includes a first CP length (e.g., the CPs 212a or 212c). A second symbol (e.g., the symbols 210b and 210d) of the first plurality of symbols includes a second CP length (e.g., the CPs 212b or 212d) that is longer than the first CP length. In an embodiment, the first symbol includes data and the second symbol includes a reference sequence (e.g., a DMRS).

In an embodiment, the configurable CP length is based on at least a number of the first plurality of symbols including a reference sequence in the transmission period. In an embodiment, the first communication device may communicate the first communication signal using a MCS, where the configurable CP length is based on at least the MCS. In an embodiment, the configurable CP length is based on at least an operating SNR for communicating the first communication signal. In an embodiment, the first CP configuration is identified based on an SCS of the first plurality of symbols.

In an embodiment, the first wireless communication device may correspond to a BS and the second wireless communication device may correspond to a UE. In such an embodiment, the first wireless communication device may transmit, to the second wireless communication device, the identified first CP configuration.

In an embodiment, the first wireless communication device may correspond to a UE and the second wireless communication device may correspond to a BS. In such an embodiment, the first wireless communication device may receive, from the second wireless communication device, the identified first CP configuration.

In an embodiment, the first communication signal is communicated in a first link direction. The first wireless communication device may communicate, with the second wireless communication device in a second link direction different from the first link direction, a second communication signal including a second plurality of symbols. Each of the second plurality of symbols includes a CP length based on a second CP configuration different from the first CP configuration. For example, the first link direction can be UL and the second link direction can be DL. Alternatively, the first link direction can be DL and the second link direction can be UL.

In an embodiment, the first wireless communication device may communicate with the second wireless communication device, a broadcast communication signal including a second plurality of symbols, wherein each of the second plurality of symbols includes a CP length based on a predetermined CP configuration. The broadcast communication signal may include SSBs, SIB s, MIB s, RMSI, and/or OSI.

In an embodiment, the first wireless communication device may communicate with a third wireless communication device, during the transmission period, a second communication signal based on the first CP configuration concurrent with the first communication signal using FDM (e.g., as shown in the scheme 700). The third wireless communication device may be different from the second wireless communication device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising identifying, by a first wireless communication device, a first cyclic prefix (CP) configuration for a transmission period; and communicating, by the first wireless communication device with a second wireless communication device during the transmission period, a first communication signal including a first plurality of symbols, wherein each of the first plurality of symbols include an individually configurable CP length configured based on the first CP configuration.

In some embodiments, wherein a first symbol of the first plurality of symbols includes a first CP length, and wherein a second symbol of the first plurality of symbols includes a second CP length that is longer than the first CP length. In some embodiments, wherein the first symbol includes data, and wherein the second symbol includes a reference sequence. In some embodiments, wherein the configurable CP length is based on at least a number of the first plurality of symbols including a reference sequence in the transmission period. In some embodiments, wherein the communicating the first communication signal includes communicating the first communication signal using a modulation coding scheme (MCS), and wherein the configurable CP length is based on at least the MCS. In some embodiments, wherein the configurable CP length is based on at least an operating signal-to-noise-ratio (SNR) for communicating the first communication signal. In some embodiments, wherein the identifying includes identifying the first CP configuration based on a subcarrier spacing (SCS) of the first plurality of symbols. In some embodiments, the method further comprises transmitting, by the first wireless communication device to the second wireless communication device, the identified first CP configuration. In some embodiments, wherein the identifying includes receiving, by the first wireless communication device from the second wireless communication device, the first CP configuration. In some embodiments, wherein the first communication signal is communicated in a first link direction, and wherein the method further comprises communicating, by the first wireless communication device with the second wireless communication device in a second link direction different from the first link direction, a second communication signal including a second plurality of symbols, wherein each of the second plurality of symbols includes a CP length based on a second CP configuration different from the first CP configuration. In some embodiments, the method further comprises communicating, by the first wireless communication device with the second wireless communication device, a broadcast communication signal including a second plurality of symbols, wherein each of the second plurality of symbols includes a CP length based on a predetermined CP configuration. In some embodiments, the method of claim 1, further comprises communicating, by the first wireless communication device with a third wireless communication device different from the second wireless communication device during the transmission period, a second communication signal based on the first CP configuration concurrent with the first communication signal using frequency division multiplexing (FDM).

Further embodiments of the present disclosure include an apparatus comprising a processor configured to identify a first cyclic prefix (CP) configuration for a transmission period; and a transceiver configured to communicate, with a first wireless communication device during the transmission period, a first communication signal including a first plurality of symbols, wherein each of the first plurality of symbols include an individually configurable cyclic prefix (CP) length configured based on the first CP configuration. In some embodiments, wherein a first symbol of the first plurality of symbols includes a first CP length, and wherein a second symbol of the first plurality of symbols includes a second CP length that is longer than the first CP length. In some embodiments, wherein the first symbol includes data, and wherein the second symbol includes a reference sequence. In some embodiments, wherein the configurable CP length is based on at least a number of the first plurality of symbols including a reference sequence in the transmission period. In some embodiments, wherein the transceiver is further configured to communicate the first communication signal by communicating the first communication signal using a modulation coding scheme (MCS), and wherein the configurable CP length is based on at least the MCS. In some embodiments, wherein the configurable CP length is based on at least an operating signal-to-noise-ratio (SNR) for communicating the first communication signal. In some embodiments, wherein the processor is further configured to identify the first CP configuration by identifying the first CP configuration based on a subcarrier spacing (SCS) of the first plurality of symbols. In some embodiments, wherein the transceiver is further configured to transmit, to the first wireless communication device, the identified first CP configuration. In some embodiments, wherein the transceiver is further configured to receive, from the first wireless communication device, the first CP configuration. In some embodiments, wherein the first communication signal is communicated in a first link direction, and wherein the transceiver is further configured to communicate, with the first wireless communication device in a second link direction different from the first link direction, a second communication signal including a second plurality of symbols, wherein each of the second plurality of symbols includes a CP length based on a second CP configuration different from the first CP configuration. In some embodiments, wherein the transceiver is further configured to communicate, with the first wireless communication device, a broadcast communication signal including a second plurality of symbols, wherein each of the second plurality of symbols includes a CP length based on a predetermined CP configuration. In some embodiments, wherein the transceiver is further configured to communicate, with a second wireless communication device different from the first wireless communication device during the transmission period, a second communication signal based on the first CP configuration concurrent with the first communication signal using frequency division multiplexing (FDM).

Further embodiments of the present disclosure include a computer-readable medium having program code recorded thereon, the program code comprising code for causing a first wireless communication device to identify a first cyclic prefix (CP) configuration for a transmission period; and code for causing the first wireless communication device to communicate, with a second wireless communication device during the transmission period, a first communication signal including a first plurality of symbols, wherein each of the first plurality of symbols include an individually configurable cyclic prefix (CP) length configured based on the first CP configuration.

In some embodiments, wherein a first symbol of the first plurality of symbols includes a first CP length, and wherein a second symbol of the first plurality of symbols includes a second CP length that is longer than the first CP length. In some embodiments, wherein the first symbol includes data, and wherein the second symbol includes a reference sequence. In some embodiments, wherein the configurable CP length is based on at least a number of the first plurality of symbols including a reference sequence in the transmission period. In some embodiments, wherein the code for causing the first wireless communication device to communicate the first communication signal is further configured to communicate the first communication signal using a modulation coding scheme (MCS), and wherein the configurable CP length is based on at least the MCS. In some embodiments, wherein the configurable CP length is based on at least an operating signal-to-noise-ratio (SNR) for communicating the first communication signal. In some embodiments, wherein the code for causing the first wireless communication device to identify the first CP configuration is further configured to identify the first CP configuration based on a subcarrier spacing (SCS) of the first plurality of symbols. In some embodiments, the computer-readable medium of claim 25, further comprising code for causing the first wireless communication device to transmit, to the second wireless communication device, the identified first CP configuration. In some embodiments, wherein the code for causing the first wireless communication device to identify the first CP configuration is further configured to receive, from the second wireless communication device, the first CP configuration. In some embodiments, wherein the first communication signal is communicated in a first link direction, and wherein the computer-readable medium further comprises code for causing the first wireless communication device to communicate, with the second wireless communication device in a second link direction different from the first link direction, a second communication signal including a second plurality of symbols, wherein each of the second plurality of symbols includes a CP length based on a second CP configuration different from the first CP configuration. In some embodiments, the computer-readable medium further comprises code for causing the first wireless communication device to communicate, with the second wireless communication device, a broadcast communication signal including a second plurality of symbols, wherein each of the second plurality of symbols includes a CP length based on a predetermined CP configuration. In some embodiments, the computer-readable medium further comprises code for causing the first wireless communication device to communicate, with a third wireless communication device different from the second wireless communication device during the transmission period, a second communication signal based on the first CP configuration concurrent with the first communication signal using frequency division multiplexing (FDM).

Further embodiments of the present disclosure include an apparatus comprising means for identifying a first cyclic prefix (CP) configuration for a transmission period; and means for communicating, with a first wireless communication device during the transmission period, a first communication signal including a first plurality of symbols, wherein each of the first plurality of symbols include an individually configurable cyclic prefix (CP) length configured based on the first CP configuration.

In some embodiments, wherein a first symbol of the first plurality of symbols includes a first CP length, and wherein a second symbol of the first plurality of symbols includes a second CP length that is longer than the first CP length. In some embodiments, wherein the first symbol includes data, and wherein the second symbol includes a reference sequence. In some embodiments, wherein the configurable CP length is based on at least a number of the first plurality of symbols including a reference sequence in the transmission period. In some embodiments, wherein the means for communicating the first communication signal is further configured to communicate the first communication signal using a modulation coding scheme (MCS), and wherein the configurable CP length is based on at least the MCS. In some embodiments, wherein the configurable CP length is based on at least an operating signal-to-noise-ratio (SNR) for communicating the first communication signal. In some embodiments, wherein the means for identifying the first CP configuration is further configured to identify the first CP configuration based on a subcarrier spacing (SCS) of the first plurality of symbols. In some embodiments, the apparatus further comprises means for transmitting, to the first wireless communication device, the identified first CP configuration. In some embodiments, wherein the means for identifying the first CP configuration is further configured to receive, from the first wireless communication device, the first CP configuration. In some embodiments, wherein the first communication signal is communicated in a first link direction, and wherein the apparatus further comprises means for communicating, with the first wireless communication device in a second link direction different from the first link direction, a second communication signal including a second plurality of symbols, wherein each of the second plurality of symbols includes a CP length based on a second CP configuration different from the first CP configuration. In some embodiments, the apparatus further comprises means for communicating, with the first wireless communication device, a broadcast communication signal including a second plurality of symbols, wherein each of the second plurality of symbols includes a CP length based on a predetermined CP configuration. In some embodiments, the apparatus further comprises means for communicating, with a second wireless communication device different from the first wireless communication device during the transmission period, a second communication signal based on the first CP configuration concurrent with the first communication signal using frequency division multiplexing (FDM).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    identifying, by a first wireless communication device, a first cyclic prefix (CP) configuration for a transmission period; and
    communicating, by the first wireless communication device with a second wireless communication device during the transmission period, a first communication signal including a first plurality of symbols, wherein each of the first plurality of symbols include an individually configurable CP length configured based on the first CP configuration, wherein a first symbol of the first plurality of symbols includes a first CP length and a second symbol of the first plurality of symbols includes a second CP length that is longer than the first CP length, and wherein a demodulation reference signal (DMRS) is included within the second symbol.

2. The method of claim 1, wherein the configurable CP length is based on at least a number of the first plurality of symbols including a reference sequence in the transmission period.

3. The method of claim 1, wherein the configurable CP length is based on at least one of a modulation coding scheme (MCS) used for communicating the first communication signal, an operating signal-to-noise-ratio (SNR) for communicating the first communication signal, or
    a subcarrier spacing (SCS) of the first plurality of symbols in the first communication signal.

4. The method of claim 1, further comprising:
    transmitting, by the first wireless communication device to the second wireless communication device, the identified first CP configuration.

5. The method of claim 1, wherein the identifying includes:
    receiving, by the first wireless communication device from the second wireless communication device, the first CP configuration.

6. The method of claim 1, wherein the first communication signal is communicated in a first link direction, and wherein the method further comprises:
    communicating, by the first wireless communication device with the second wireless communication device in a second link direction different from the first link direction, a second communication signal including a second plurality of symbols, wherein each of the second plurality of symbols includes a CP length based on a second CP configuration different from the first CP configuration.

7. The method of claim 1, further comprising:
    communicating, by the first wireless communication device with the second wireless communication device, a broadcast communication signal including a second plurality of symbols, wherein each of the second plurality of symbols includes a CP length based on a predetermined CP configuration.

8. The method of claim 1, further comprising:
    communicating, by the first wireless communication device with a third wireless communication device different from the second wireless communication device during the transmission period, a second communication signal based on the first CP configuration concurrent with the first communication signal using frequency division multiplexing (FDM).

9. An apparatus comprising:
    a processor configured to identify a first cyclic prefix (CP) configuration for a transmission period; and
    a transceiver configured to communicate, with a first wireless communication device during the transmission period, a first communication signal including a first plurality of symbols, wherein each of the first plurality of symbols include an individually configurable cyclic prefix (CP) length configured based on the first CP configuration, wherein a first symbol of the first plurality of symbols includes a first CP length and a second symbol of the first plurality of symbols includes a second CP length that is longer than the first CP length, and wherein a demodulation reference signal (DMRS) is included within the second symbol.

10. The apparatus of claim 9, wherein the configurable CP length is based on at least a number of the first plurality of symbols including a reference sequence in the transmission period.

11. The apparatus of claim 9, wherein the configurable CP length is based on at least one of a modulation coding scheme (MCS) used for communicating the first communications signal, an operating signal-to-noise-ratio (SNR) for communicating the first communication signal, or a subcarrier spacing (SCS) of the first plurality of symbols in the first communication signal.

12. The apparatus of claim 9, wherein the transceiver is further configured to:
   transmit, to the first wireless communication device, the identified first CP configuration.

13. The apparatus of claim 9, wherein the transceiver is further configured to:
   receive, from the first wireless communication device, the first CP configuration.

14. The apparatus of claim 9, wherein the first communication signal is communicated in a first link direction, and wherein the transceiver is further configured to:
   communicate, with the first wireless communication device in a second link direction different from the first link direction, a second communication signal including a second plurality of symbols, wherein each of the second plurality of symbols includes a CP length based on a second CP configuration different from the first CP configuration.

15. The apparatus of claim 9, wherein the transceiver is further configured to:
   communicate, with the first wireless communication device, a broadcast communication signal including a second plurality of symbols, wherein each of the second plurality of symbols includes a CP length based on a predetermined CP configuration.

16. The apparatus of claim 9, wherein the transceiver is further configured to:
   communicate, with a second wireless communication device different from the first wireless communication device during the transmission period, a second communication signal based on the first CP configuration concurrent with the first communication signal using frequency division multiplexing (FDM).

17. A computer-readable medium having program code recorded thereon, the program code comprising:
   code for causing a first wireless communication device to identify a first cyclic prefix (CP) configuration for a transmission period; and
   code for causing the first wireless communication device to communicate, with a second wireless communication device during the transmission period, a first communication signal including a first plurality of symbols, wherein each of the first plurality of symbols include an individually configurable cyclic prefix (CP) length configured based on the first CP configuration, wherein a first symbol of the first plurality of symbols includes a first CP length and a second symbol of the first plurality of symbols includes a second CP length that is longer than the first CP length, and wherein a demodulation reference signal (DMRS) is included within the second symbol.

18. The computer-readable medium of claim 17, wherein the configurable CP length is based on at least a number of the first plurality of symbols including a reference sequence in the transmission period.

19. The computer-readable medium of claim 17, wherein the configurable CP length is based on at least one of a modulation coding scheme (MCS) used for communicating the first communication signal, an operating signal-to-noise-ratio (SNR) for communicating the first communication signal, or a subcarrier spacing (SCS) of the first plurality of symbols in the first communication signal.

20. The computer-readable medium of claim 17, further comprising:
   code for causing the first wireless communication device to transmit, to the second wireless communication device, the identified first CP configuration.

21. The computer-readable medium of claim 17, wherein the code for causing the first wireless communication device to identify the first CP configuration is further configured to:
   receive, from the second wireless communication device, the first CP configuration.

22. The computer-readable medium of claim 17, wherein the first communication signal is communicated in a first link direction, and wherein the computer-readable medium further comprises:
   code for causing the first wireless communication device to communicate, with the second wireless communication device in a second link direction different from the first link direction, a second communication signal including a second plurality of symbols, wherein each of the second plurality of symbols includes a CP length based on a second CP configuration different from the first CP configuration.

23. The computer-readable medium of claim 17, further comprising:
   code for causing the first wireless communication device to communicate, with the second wireless communication device, a broadcast communication signal including a second plurality of symbols, wherein each of the second plurality of symbols includes a CP length based on a predetermined CP configuration.

24. The computer-readable medium of claim 17, further comprising:
   code for causing the first wireless communication device to communicate, with a third wireless communication device different from the second wireless communication device during the transmission period, a second communication signal based on the first CP configuration concurrent with the first communication signal using frequency division multiplexing (FDM).

* * * * *